(12) United States Patent
Hayashi et al.

(10) Patent No.: US 9,876,459 B2
(45) Date of Patent: Jan. 23, 2018

(54) MOTOR DRIVING CIRCUIT, MOTOR DEVICE, AND ELECTRIC VEHICLE

(71) Applicant: Panasonic Intellectual Property Management Co., Ltd., Osaka (JP)

(72) Inventors: Yoshinori Hayashi, Osaka (JP); Hoshihito Okada, Osaka (JP); Yoshihiko Maeda, Osaka (JP); Yoichi Enomoto, Osaka (JP); Hiroshi Takao, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/583,605

(22) Filed: May 1, 2017

(65) Prior Publication Data

US 2017/0237382 A1  Aug. 17, 2017

Related U.S. Application Data

(63) Continuation of application No. 15/056,665, filed on Feb. 29, 2016, now Pat. No. 9,673,746, which is a
(Continued)

(30) Foreign Application Priority Data

Mar. 23, 2012  (JP) ................................. 2012-067793

(51) Int. Cl.
*G01R 31/02* (2006.01)
*H02P 29/024* (2016.01)
(Continued)

(52) U.S. Cl.
CPC ........ *H02P 29/024* (2013.01); *B60L 11/1803* (2013.01); *B60L 15/007* (2013.01);
(Continued)

(58) Field of Classification Search
CPC .. H02P 1/00; H02P 27/04; H02P 27/06; H02P 21/141; H02P 21/146; H02P 21/00;
(Continued)

(56) References Cited

U.S. PATENT DOCUMENTS 7,187,144 B2  3/2007 Nakayama
7,773,353 B2  8/2010 Uchida
(Continued)

FOREIGN PATENT DOCUMENTS

JP  08-294225 A  11/1996
JP  09-117050 A  5/1997
(Continued)

OTHER PUBLICATIONS

U.S. Notice of Allowance dated Feb. 13, 2017 issued in U.S. Appl. No. 15/056,665.
(Continued)

*Primary Examiner* — Antony M Paul
(74) *Attorney, Agent, or Firm* — McDermott Will & Emery LLP

(57) ABSTRACT

A motor driving circuit has a supply line connected to a DC power source, an inverter whose input side is connected to the supply line and whose output side is connected to a motor, a power switch inserted in the supply line for switching the supply line between conducting and cut-off states, a voltage detector for detecting a voltage between the direct-current power source and the power switch, and an insulation resistance detector for first detecting, based on a result of detection by the voltage detector with the power switch in the cut-off state, an insulation resistance on the preceding-stage side of the power switch and subsequently detecting, based on a result of detection by the voltage
(Continued)

detector with the power switch in the conducting state, an insulation resistance on the succeeding-stage side of the power switch.

12 Claims, 4 Drawing Sheets

Related U.S. Application Data continuation of application No. 14/387,203, filed as application No. PCT/JP2013/057120 on Mar. 14, 2013, now Pat. No. 9,312,797.

(51) Int. Cl.
| | | |
|---|---|---|
| *H02M 7/539* | (2006.01) | |
| *H02M 1/084* | (2006.01) | |
| *H02P 6/14* | (2016.01) | |
| *B60L 11/18* | (2006.01) | |
| *B60L 15/00* | (2006.01) | |

(52) U.S. Cl.
CPC .......... *H02M 1/084* (2013.01); *H02M 7/539* (2013.01); *H02P 6/14* (2013.01); *B60L 2210/44* (2013.01); *B60Y 2200/91* (2013.01)

(58) Field of Classification Search
CPC ......... H02P 23/00; H02P 25/00; B60W 10/08; Y02T 10/70; B60L 3/04; H01H 31/12; G01R 31/00; G01R 31/02; G01R 27/14; G01R 27/18
USPC .......... 318/139, 800, 801, 400.01, 700, 490; 324/541, 691, 606, 503, 509, 519, 705; 361/42, 56, 93.7, 812; 363/40, 55, 95, 363/97, 98; 340/647; 702/58, 53

See application file for complete search history.

(56) References Cited

U.S. PATENT DOCUMENTS

| | | |
|---|---|---|
| 7,994,799 B2 | 8/2011 | Tachizaki |
| 8,878,543 B2 | 11/2014 | Morimoto |
| 2008/0094022 A1 | 4/2008 | Horikoshi et al. |
| 2008/0150549 A1 | 6/2008 | Horikoshi et al. |
| 2010/0171511 A1* | 7/2010 | Horikoshi .......... G01R 31/1263 324/551 |

FOREIGN PATENT DOCUMENTS

| | | |
|---|---|---|
| JP | 2005-073443 A | 3/2005 |
| JP | 2005-304138 A | 10/2005 |
| JP | 2009-027830 A | 2/2009 |

OTHER PUBLICATIONS

International Search Report issued in International Application No. PCT/JP2013/057120, dated Jun. 11, 2013, with English translation.
U.S. Notice of Allowance dated Dec. 4, 2015 issued in U.S. Appl. No. 14/387,203.

* cited by examiner

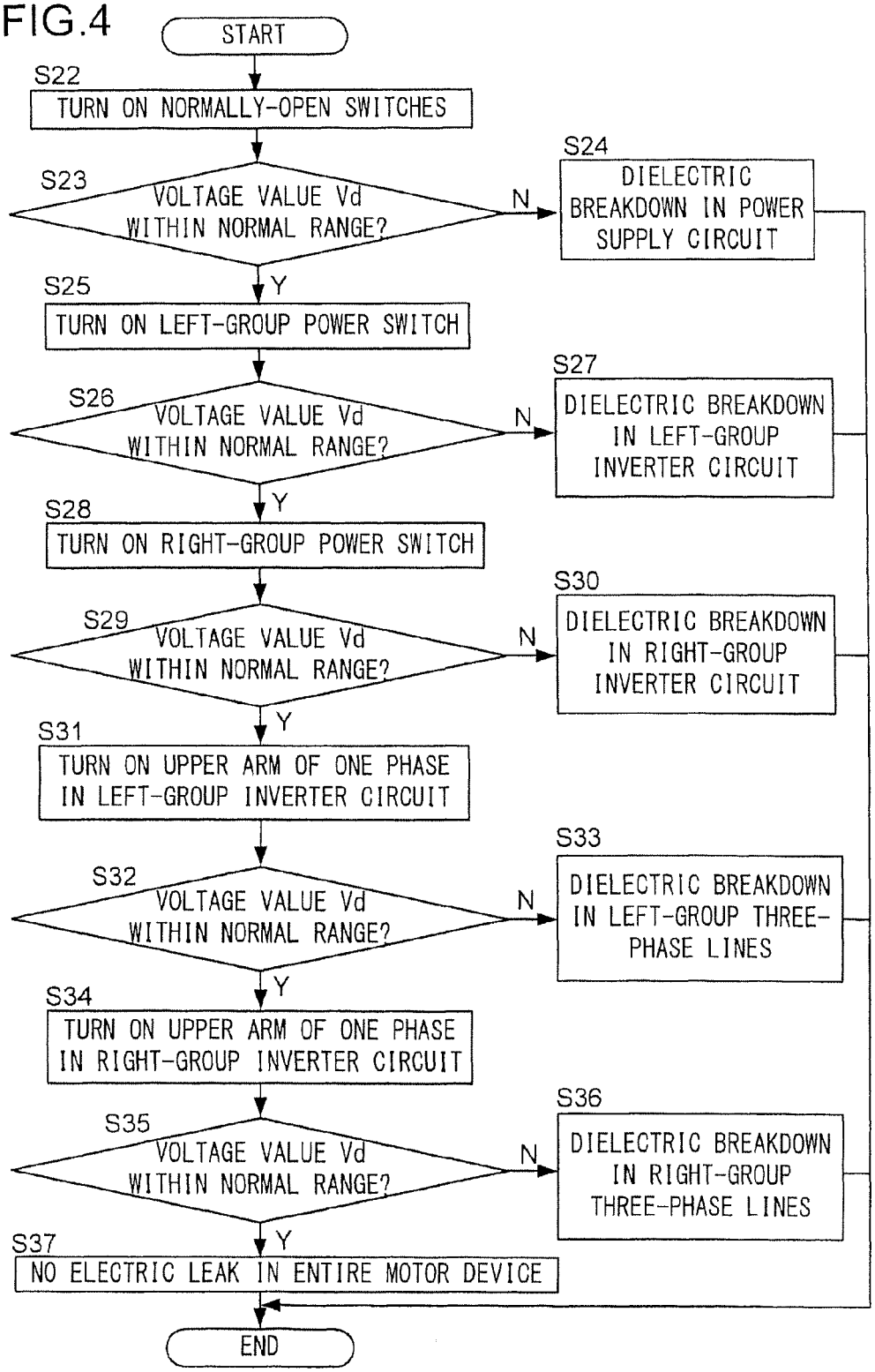

MOTOR DRIVING CIRCUIT, MOTOR DEVICE, AND ELECTRIC VEHICLE

RELATED APPLICATIONS

This application is a continuation patent application of U.S. patent application Ser. No. 15/056,665, filed on Feb. 29, 2016 which is a continuation application of U.S. patent application Ser. No. 14/387,203, filed on Sep. 22, 2014, now U.S. Pat. No. 9,312,797 issued on Apr. 12, 2016, which is the U.S. National Phase under 35 U.S.C. §371 of International Patent Application No. PCT/JP2013/057120, filed on Mar. 14, 2013, which in turn claims the benefit of Japanese Patent Application No. 2012-067793, filed on Mar. 23, 2012, the disclosures of which are incorporated by reference therein.

TECHNICAL FIELD

The present invention relates to motor driving circuits, motor devices, and electric vehicle.

BACKGROUND ART

Conventionally, as a motor driving circuit for use on an electric vehicle or the like, one having a function of detecting insulation resistance has been proposed. With such a motor driving circuit, for example, on detection of dielectric breakdown, appropriate measures can be taken so that the resulting trouble may be avoided as much as possible. Patent Document 1 identified below discloses an electric automobile system in which, while a controller monitors the voltages of a high-voltage battery and an auxiliary battery, a voltage converter and an electromechanical system are operated in coordination to achieve necessary control. Patent Document 2 identified below discloses a device comprising means for detecting an induced voltage ascribable to an electric leak so that, on detection of an induced voltage, the supply of power may be shut off.

LIST OF CITATIONS

Patent Literature

Patent Document 1: JP-A-2005-73443
Patent Document 2: JP-A-H9-117050

SUMMARY OF THE INVENTION

Technical Problem

A motor driving circuit having a function of detecting insulation resistance can be configured, for example to enable it to identify the location of dielectric breakdown with certain exactitude, so as to detect insulation resistance separately for different portions. Inconveniently, however, providing a separate circuit for insulation resistance detection for each such portion complicates the configuration of the motor driving circuit, and may invite increased production costs. Incidentally, neither Patent Document 1 nor Patent Document 2 teaches a configuration that detects insulation resistance on a portion-by-portion basis.

Against the background discussed above, an object of the present invention is to provide a motor driving circuit that detects insulation resistance on a portion-by-portion basis and that nevertheless allows easy simplification of circuit configuration, and to provide a motor device and an electric vehicle provided with such a motor driving circuit.

Means for Solving the Problem

According to one aspect of the present invention, a motor driving circuit is provided with: a supply line connected to a direct-current power source; an inverter of which the input side is connected to the supply line and of which the output side is connected to a motor, the inverter converting direct-current electric power fed from the supply line into alternating-current electric power and feeding the alternating-current electric power to the motor; a power switch inserted in the supply line for switching the supply line between a conducting state and a cut-off state; a voltage detector for detecting the voltage between the direct-current power source and the power switch; and an insulation resistance detector for first performing a first detection operation to detect, based on the result of detection by the voltage detector with the power switch in the cut-off state, an insulation resistance on the preceding-stage side of the power switch, and subsequently performing a second detection operation to detect, based on the result of detection by the voltage detector with the power switch in the conducting state, an insulation resistance on the succeeding-stage side of the power switch.

Advantageous Effects of the Invention

With a motor driving circuit according to the present invention, it is possible to detect insulation resistance on a portion-by-portion basis, and in addition allows easy simplification of circuit configuration.

BRIEF DESCRIPTION OF DRAWINGS

FIG. 4 is a flow chart of insulation resistance detection operation according to the second embodiment.

DESCRIPTION OF EMBODIMENTS

Hereinafter, motor devices embodying the present invention will be described by way of a first and a second embodiment. The first embodiment is for driving one motor, and the second embodiment is for driving a plurality of motors (presented will be an example involving two motors).

First Embodiment

Figure 1:
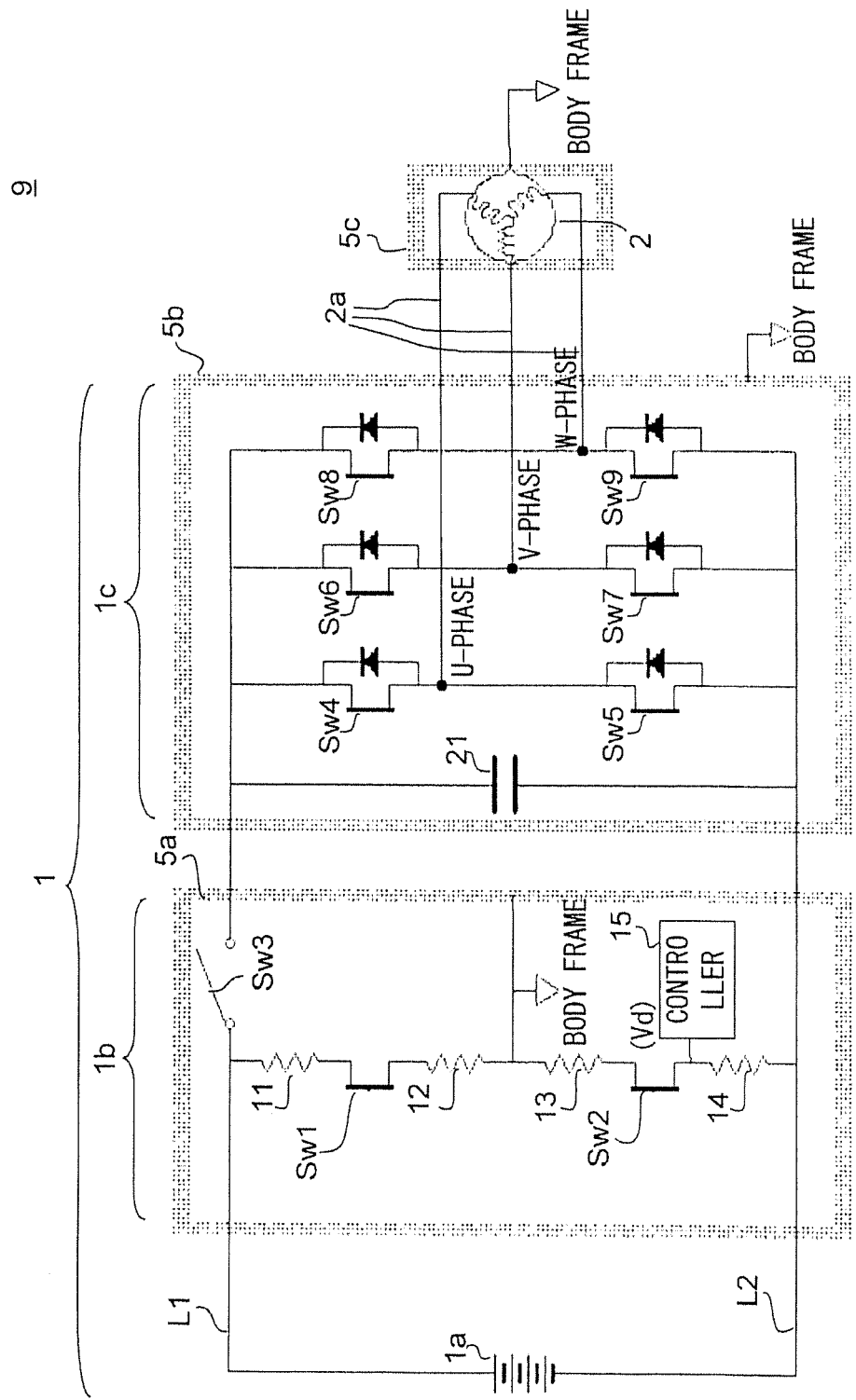
FIG. 1 is a configuration diagram of a motor device according to a first embodiment of the present invention.

[Configuration and Other Features of a Motor Device]
First, a first embodiment of the present invention will be described. FIG. 1 is a configuration diagram of a motor device 9 according to this embodiment. The motor device 9 is composed of a motor driving circuit 1 and a motor 2 connected to it. The motor device 9 is provided on an electric vehicle (such as an electric bicycle, a two-wheeled motor vehicle, a three-wheeled motor vehicle, or a four-wheeled motor vehicle), and the motor 2 serves to rotate a driving wheel of such an electric vehicle.

The motor driving circuit 1 has a DC (direct-current) power source 1a, a power supply circuit 1b, and an inverter circuit 1c. The power supply circuit 1b, the inverter circuit 1c, and the motor 2 are housed in separate metal cases (5a to 5c) respectively. These metal cases (5a to 5c) are connected together via the body frame of the electric vehicle. In the present description, unless otherwise stated, within the motor driving circuit, a "preceding-stage side" refers to a side closer to the DC power source, and a "succeeding-stage side" refers to a side closer to the motor.

The DC power source 1a is, for example, a battery for an electric vehicle. The positive electrode side of the DC power source 1a is connected to a positive line L1 (supply line), and the negative electrode side of the DC power source 1a is connected to a negative line L2 (ground line). The voltage of the DC power source 1a (the battery voltage) is previously known. The DC power source 1a, the power supply circuit 1b, and the inverter circuit 1c are connected together via the positive line L1 and the negative line L2.

The power supply circuit 1b has four resistors (11 to 14), a controller 15, two normally-open switches (Sw1, Sw2), and a power switch Sw3.

The power switch Sw3 is a FET (field-effect transistor), the channel across whose both terminals (source and drain) is controlled between an open and a closed state (an on and an off state) by the controller 15. The power switch Sw3 is inserted in the positive line L1, and serves to switch the positive line L1 between a conducting and a cut-off state.

The normally-open switches (Sw1, Sw2) are each a photoMOS relay, the channel across whose both terminals (source and drain) is controlled between an open and a closed state (an on and an off state) by the controller 15. One end of the normally-open switch Sw1 is connected via the resistor 11 to the positive line L1 (on the preceding-stage side of the power switch Sw3), and the other end of the normally-open switch Sw1 is connected to one end of the resistor 12. The other end of the resistor 12 is connected to one end of the resistor 13. One end of the normally-open switch Sw2 is connected to the other end of the resistor 13, and the other end of the normally-open switch Sw2 is connected via the resistor 14 to the negative line L2.

The connection point between the resistors 12 and 13 is connected to the body frame of the electric vehicle. The connection point between the normally-open switch Sw2 and the resistor 14 is connected to the controller 15. Thus, when the normally-open switches (Sw1, Sw2) are both in the closed state, the controller 15 can detect a voltage value Vd which results from division of the voltage between the positive line L1 and the negative line L2 by the resistors (11 to 14).

The portion of the power supply circuit 1b constituted by the resistors (11 to 14) serves as an insulation resistance detection circuit, and the result of the detection of the voltage value Vd is used in the detection of insulation resistance (resistance with respect to the metal cases or the body frame). Specifically, if there is any location with a low insulation resistance (a location of dielectric breakdown), the voltage of the DC power source 1a is applied via the body frame or the metal cases to the insulation resistance detection circuit, and this produces a variation in the voltage value Vd, making it possible to detect the insulation resistance. The operation for detecting insulation resistance (insulation resistance detection operation) will be described in detail later.

The inverter circuit 1c is provided on the succeeding-stage side of the power supply circuit 1b. The inverter circuit 1c is supplied with a DC voltage from the DC power source 1a, and serves to convert the DC voltage into a three-phase AC (alternating-current) voltage to output it to the motor 2. The inverter circuit 1c has a smoothing capacitor 21 and also three-phase arms comprising a U-phase, a V-phase, and a W-phase arm.

One end of the smoothing capacitor 21 is connected to the positive line L1, and the other end of the smoothing capacitor 21 is connected to the negative line L2. The U-phase, V-phase, and W-phase arms are connected in parallel, each between the positive line L1 and the negative line L2.

The U-phase arm has two switching devices (Sw4 and Sw5) connected in series between the positive line L1 and the negative line L2 and two diodes connected in parallel with those switching devices (Sw4 and Sw5) respectively. Each diode is arranged with its cathode pointing to the positive line L1 and its anode pointing to the negative line L2. The switching device Sw4 corresponds to an upper-arm switch (upper device) of the U phase, and the switching device Sw5 corresponds to a lower-arm switch (lower device) of the U phase.

The V-phase arm has two switching devices (Sw6 and Sw7) connected in series between the positive line L1 and the negative line L2 and two diodes connected in parallel with those switching devices (Sw6 and Sw7) respectively. Each diode is arranged with its cathode pointing to the positive line L1 and its anode pointing to the negative line L2. The switching device Sw6 corresponds to an upper-arm switch (upper device) of the V phase, and the switching device Sw7 corresponds to a lower-arm switch (lower device) of the V phase.

The W-phase arm has two switching devices (Sw8 and Sw9) connected in series between the positive line L1 and the negative line L2 and two diodes connected in parallel with those switching devices (Sw8 and Sw9) respectively. Each diode is arranged with its cathode pointing to the positive line L1 and its anode pointing to the negative line L2. The switching device Sw8 corresponds to an upper-arm switch (upper device) of the W phase, and the switching device Sw9 corresponds to a lower-arm switch (lower device) of the W phase.

The switching devices (Sw4 to Sw9) constituting the inverter circuit 1c are each a FET, the channel across whose both terminals (source and drain) is controlled between an open and a closed state (an on and an off state) by the controller 15.

The motor 2 is, for example, a three-phase permanent-magnet synchronous motor, and is driven by the three-phase AC voltage fed from the inverter circuit 1c. The motor 2 has three-phase lines 2a, which comprise a U-phase, a V-phase, and a W-phase line, and these lines are connected together inside the motor 2. The U-phase, V-phase, and W-phase lines are connected to, inside the inverter circuit 1c, between the upper and lower arms of the U, V, and W phases respectively.

The controller 15 provided in the power supply circuit 1b can output control signals to control the switches (Sw1 to Sw9) individually between the on and off states, and controls the operation of the motor driving circuit 1 through a prescribed procedure. One example of the operation performed by the motor driving circuit 1 is insulation resistance detection operation for detecting whether or not the insulation resistance of the motor device 9 is satisfactory or not.

[Insulation Resistance Detection Operation]

Figure 2:
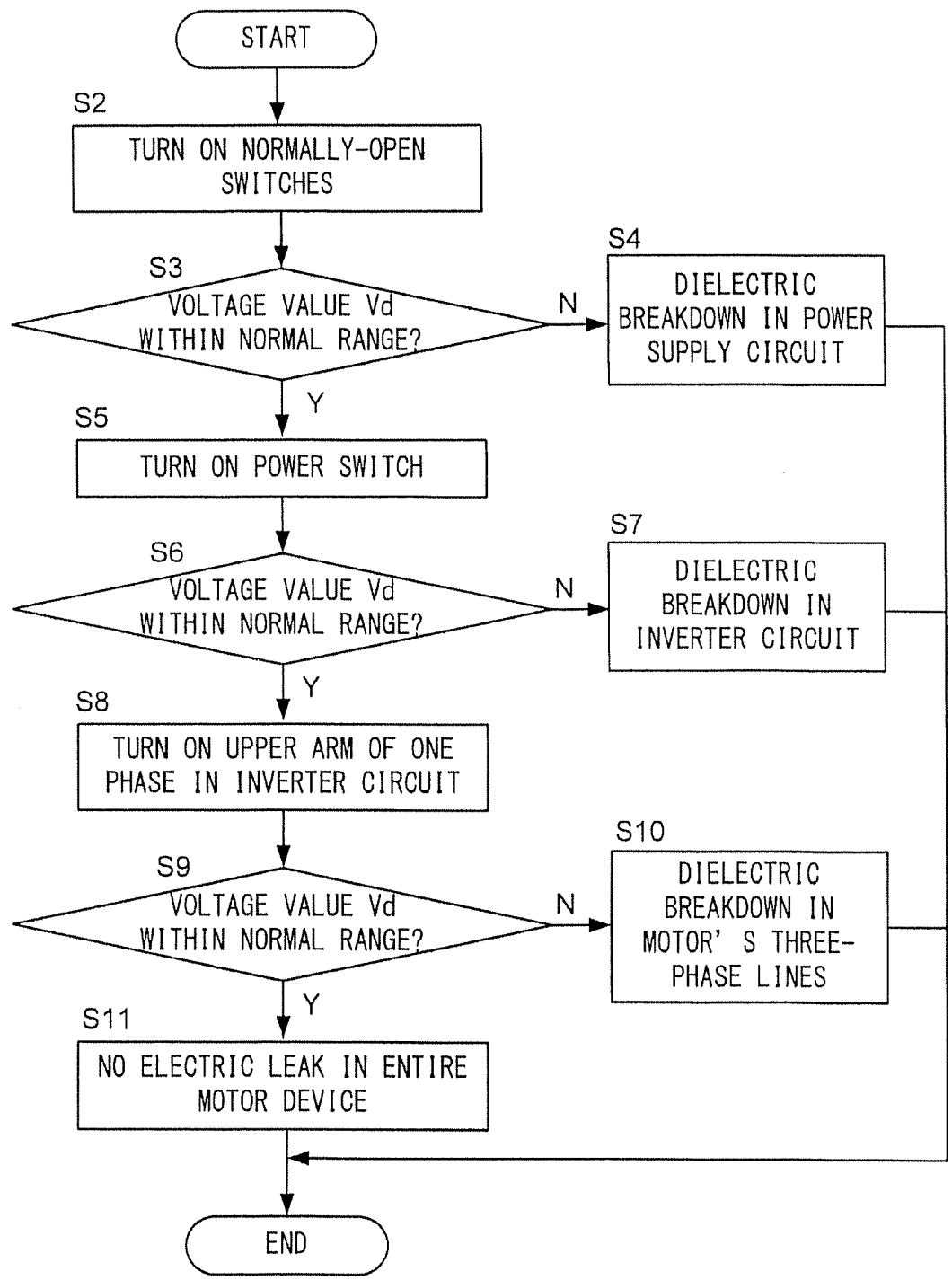
FIG. 2 is a flow chart of insulation resistance detection operation according to the first embodiment.

In an electric vehicle incorporating the motor device 9, when an ignition key is turned on, the vehicle goes through a predetermined start-up mode into a running mode in which it can run. In the start-up mode, the motor driving circuit 1 performs insulation resistance detection operation. Now, the insulation resistance detection operation performed by the motor driving circuit 1 will be described with reference to a flow chart in FIG. 2. At the stage before the start of the insulation resistance detection operation, the switches (Sw1 to Sw9) are all off.

First, the controller 15 executes an insulation resistance sensor start-up conformation (step S1). The insulation resistance sensor start-up conformation is operation performed, before closing the normally-open switches (Sw1, Sw2), to check whether or not the detected value of the voltage Vd is normal (whether or not it falls within a tolerated error range with respect to 0 V). If the detected value of the voltage Vd is abnormal, for example, an alarm indicating the abnormality can be given off, and the insulation resistance detection operation can be aborted.

Next, the controller 15 turns on both normally-open switches (Sw1, Sw2) (step S2). As a result, the positive line L1 is connected via the resistors 11 and 12 to the body frame, and the negative line L2 is connected via the resistors 13 and 14 to the body frame. At this stage, the power switch Sw3 is still off, and accordingly the portion on the succeeding-stage side of the power switch Sw3 (the inverter circuit 1c and the motor 2) does not conduct to the positive electrode of the DC power source 1a.

In this state, the controller 15 checks whether or not the voltage value Vd falls within a prescribed normal range (step S3). This operation is aimed at checking whether or not the insulation resistance of the power supply circuit 1b (the portion on the preceding-stage side of the power switch Sw3) is satisfactory. The normal range is determined with consideration given to, for example, fluctuations in the voltage of the DC power source 1a so that it is possible to properly detect whether or not the insulation resistance is satisfactory.

When the insulation resistance in the power supply circuit 1b is sufficiently high (normal), the voltage value Vd is close to the value of the voltage resulting from division of the voltage of the DC power source 1a by the resistors (11 to 14). However, the lower the insulation resistance (that is, the more serious the abnormality), the farther the voltage value Vd deviates from the value of the voltage resulting from division of the voltage of the DC power source 1a by the resistors (11 to 14).

Based on this principle, the controller 15 recognizes, when the voltage value Vd falls within the normal range (step S3, Y), that the insulation resistance of the power supply circuit 1b is normal (no dielectric breakdown has occurred) and, when the voltage value Vd falls outside the normal range (step S3, N), that the insulation resistance is abnormal (dielectric breakdown has occurred) (step S4).

On recognizing that the insulation resistance of the power supply circuit 1b is abnormal, the controller 15 ends the insulation resistance detection operation. Here, the controller 15 can be so configured as to give off a predetermined alarm A (display, sound, or otherwise indicate it) to notify that the insulation resistance of the power supply circuit 1b is abnormal. This permits the user to recognize that dielectric breakdown has occurred and that it has occurred in the power supply circuit 1b.

On the other hand, on detecting that the insulation resistance of the power supply circuit 1b is normal, the controller 15 turns on the power switch Sw3 (step S5). As a result, via the power switch Sw3, the inverter circuit 1c now conducts to the positive electrode of the DC power source 1a, and thus the smoothing capacitor 21 is charged. At this stage, the upper-arm switching devices (Sw4, Sw6, Sw8) in the inverter circuit 1c are all still off, and accordingly the portion on the succeeding-stage side of those switching devices (that is, the motor 2) does not conduct to the positive electrode of the DC power source 1a.

In this state, the controller 15 checks whether or not the voltage value Vd falls within the prescribed normal range (step S6). This operation is aimed at checking whether or not the insulation resistance of the inverter circuit 1c (the portion on the succeeding-stage side of the power switch Sw3 and on the preceding-stage side of the upper arms of the inverter circuit 1c) is satisfactory.

When the insulation resistance in the inverter circuit 1b is sufficiently high (normal), the voltage value Vd is close to the value of the voltage resulting from division of the voltage of the DC power source 1a by the resistors (11 to 14). However, the lower the insulation resistance (that is, the more serious the abnormality), the farther the voltage value Vd deviates from the value of the voltage resulting from division of the voltage of the DC power source 1a by the resistors (11 to 14).

Through the insulation resistance detection operation thus far, it is already found that the insulation resistance of the power supply circuit 1b is normal. Accordingly, if the voltage value Vd is a value deviated from the value of the voltage resulting from division of the voltage of the DC power source 1a by the resistors (11 to 14), it can be concluded that the cause is a low insulation resistance in the inverter circuit 1b.

Based on this principle, the controller 15 recognizes, when the voltage value Vd falls within the normal range (step S6, Y), that the insulation resistance of the inverter circuit 1c is normal (no dielectric breakdown has occurred) and, when the voltage value Vd falls outside the normal range (step S6, N), that the insulation resistance is abnormal (dielectric breakdown has occurred) (step S7).

On recognizing that the insulation resistance of the inverter circuit 1c is abnormal, the controller 15 ends the insulation resistance detection operation. Here, the controller 15 can be so configured as to give off a predetermined alarm B (different from alarm A) to notify that the insulation resistance of the inverter circuit 1b is abnormal. This permits the user to recognize that dielectric breakdown has occurred and that it has occurred in the inverter circuit 1c.

On the other hand, on detecting that the insulation resistance of the inverter circuit 1c is normal, the controller 15 keeps the upper arm of one phase (for example, the U phase) of the inverter circuit 1c on for a predetermined period T1 (step S8). Here, so that the upper arm may be kept on properly, first the lower arm of the same phase is kept on for a very short period and, after this lower arm is turned off, the upper arm is turned on. With respect to the operation at step S8, the control for turning on the upper and lower arms of the inverter circuit 1c can be directly performed by the controller 15 provided in the power supply circuit 1b, or can be performed by an unillustrated microprocessor (capable of operating in coordination with the controller 15 via CAN (controller area network) communication) provided in the inverter circuit 1c.

As a result, via the upper arm that is now on, the three-phase lines 2a conduct to the positive electrode of the DC power source 1a. While the upper arm is on, the controller 15 checks whether or not the voltage value Vd falls within the prescribed normal range (step S9). This operation is aimed at checking whether or not the insulation resistance of the three-phase lines 2a (the portion on the succeeding-stage side of the upper arms of the inverter circuit 1c) is satisfactory.

The above-mentioned period T1 (the period for which the upper arm is kept on) is set to be as short as possible so long as it is possible to properly check whether or not the insulation resistance of the three-phase lines 2a is satisfactory. This makes it possible to minimize the braking torque produced as a result of the upper arms being turned on while, for example, the user is pushing the electric vehicle by hand.

When the insulation resistance in the three-phase lines 2a is sufficiently high (normal), the voltage value Vd is close to the value of the voltage resulting from division of the voltage of the DC power source 1a by the resistors (11 to 14). However, the lower the insulation resistance (that is, the more serious the abnormality), the farther the voltage value Vd is deviated from the value of the voltage resulting from division of the voltage of the DC power source 1a by the resistors (11 to 14).

Through the insulation resistance detection operation thus far, it is already found that the insulation resistance is normal with respect to the power supply circuit 1b and the inverter circuit 1c. Thus, when the voltage value Vd is deviated from the value of the voltage resulting from division of the voltage of the DC power source 1a by the resistors (11 to 14), it can be concluded that the cause is a low insulation resistance in the three-phase lines 2a.

Based on this principle, the controller 15 recognizes, when the voltage value Vd falls within the normal range (step S9, Y), that the insulation resistance in the three-phase lines 2a is normal (no dielectric breakdown has occurred) and, when the voltage value Vd falls outside the normal range (step S9, N), that the insulation resistance is abnormal (dielectric breakdown has occurred) (step S10). Since the three-phase lines 2a for the different phases are connected together inside the motor 2, simply by turning on the upper arm of one phase as described above, it is possible to detect the insulation resistance for all phases.

On recognizing that the insulation resistance of the three-phase lines 2a is abnormal, the controller 15 ends the insulation resistance detection operation. Here, the controller 15 can be so configured as to give off a predetermined alarm C (different from alarms A and B) to notify that the insulation resistance of the three-phase lines 2a is abnormal. This permits the user to recognize that dielectric breakdown has occurred and that it has occurred in the three-phase lines 2a.

On the other hand, if the insulation resistance of the three-phase lines 2a is found to be normal, this means that it has been recognized that the insulation resistance is normal with respect to all of the power supply circuit 1b, the inverter circuit 1c, and the three-phase lines 2a. Accordingly, in this case, the controller 15 recognizes that the insulation resistance is normal in the entire motor device 9 (no dielectric breakdown has occurred) (step S11), and ends the insulation resistance detection operation.

[Features of the Motor Driving Circuit]

As described above, the motor driving circuit 1 according to the first embodiment is provided with: a supply line L1 connected to a DC power source 1a; an inverter circuit 1c of which the input side is connected to the supply line L1 and of which the output side is connected to a motor 2, the inverter circuit 1c converting DC electric power fed from the supply line L1 into alternating-current electric power and feeding the alternating-current electric power to the motor 2; and a power switch Sw3 inserted in the supply line L1 (for example, as in this embodiment, between the DC power source 1a and the inverter circuit 1c) for switching the supply line L1 between a conducting state and a cut-off state.

The motor driving circuit 1 is further provided with: a functional portion (voltage detector) for detecting the voltage between the DC power source 1a and the power switch Sw3; and a functional portion (insulation resistance detector) for first performing a first detection operation to detect, based on the result of detection by the voltage detector with the power switch Sw3 in the cut-off state, the insulation resistance of the power supply circuit 1b (on the preceding-stage side of the power switch Sw3), and subsequently performing a second detection operation to detect, based on the result of detection by the voltage detector with the power switch Sw3 in the conducting state, the insulation resistance of the inverter circuit 1c (on the succeeding-stage side of the power switch Sw3).

Thus, the motor driving circuit 1 can detect insulation resistance separately for different portions of the motor device 9 (in this embodiment, for each of the power supply circuit 1b and the inverter circuit 1c), and in addition, owing to insulation resistance detection for different portions being achieved by a common circuit, allows easy simplification of circuit configuration. "Portion-by-portion" detection of insulation resistance can be implemented in any other manner than in this embodiment. In one possible embodiment, insulation resistance can be detected for each of a portion (DC-side) where DC power is used and a portion (AC-side) where AC power is used. I this embodiment, the first detection operation corresponds to the operation at step S3, and the second detection operation corresponds to the operation at step S6.

The inverter circuit 1c has three-phase arms, and each arm includes an upper device and a lower device as switching devices connected in series between the positive electrode and the negative electrode of the DC power source 1a. Between the upper and lower devices of each arm, a three-phase motor 2 is connected. The insulation resistance detector performs, as the second detection operation, an operation to detect, based on the result of detection by the voltage detector with all the upper devices in an off state, the insulation resistance of the inverter circuit 1c (on the preceding-stage side of the upper devices), and performs, subsequently to the second detection operation, as a third detection operation, an operation to detect, based on the result of detection by the voltage detector with one of the upper devices in an on state, the insulation resistance of three-phase lines 2a of the motor (on the succeeding-stage side of the upper devices).

Thus, the motor driving circuit 1 can detect, with a common circuit, the insulation resistance of the power supply circuit 1b, that of the inverter circuit 1c, and that of the three-phase lines 2a. In this embodiment, the third detection operation corresponds to the operation at step S9. Although in this embodiment the inverter circuit 1c and the motor 2 are of a three-phase type, they can instead be of a single-phase type, or of a two-phase, four-phase, or any other multiple-phase type.

In the motor driving circuit 1, when an abnormal insulation resistance is detected in any of the first to third detection operations, an output (alarm A, B, or C) that is set to differ among the different detection operations is delivered. Thus, when dielectric breakdown has occurred, the user can identify its location among different portions of the motor device 9. This permits the user to react more properly than when the location is not identified.

In the motor driving circuit 1, when an abnormal insulation resistance is detected in any of the first to third detection operations, execution of any detection operation thereafter is omitted. Specifically, if an abnormal insulation resistance is detected in the first detection operation, execution of the second and third detection operations is omitted; if an abnormal insulation resistance is detected in the second detection operation, execution of the third detection operation is omitted. This prevents execution of an unnecessary detection operation, and helps reduce the operation burden on the motor driving circuit 1.

Second Embodiment

Next, a second embodiment of the present invention will be described. The following description focuses on features different from the first embodiment, and overlapping description of common features are occasionally omitted.
[Configuration and Other Features of a Motor Device]

Figure 3:
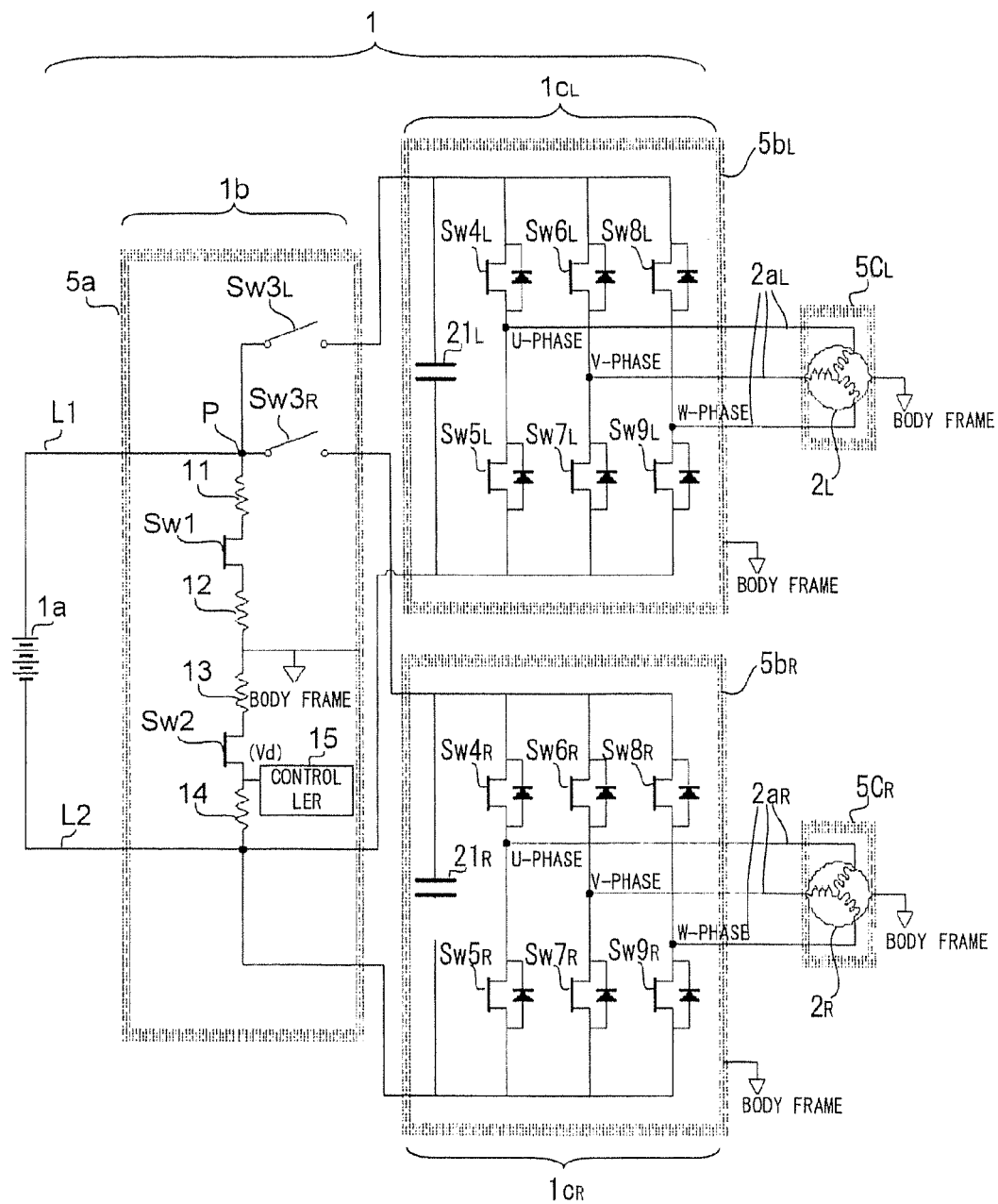
FIG. 3 is a configuration diagram of a motor device according to a second embodiment of the present invention.

FIG. 3 is a configuration diagram of a motor device 9A according to the second embodiment. In the motor device 9A, two motors ($2_L$, $2_R$) are connected to a motor driving circuit 1. More specifically, the motor driving circuit 1 has an inverter circuit and other components separately in each of two groups, namely a left group and a right group, so that the motor $2_L$ belonging to the left group is connected to a left-group inverter circuit $1c_L$ and the motor $2_R$ belonging to the right group is connected to a right-group inverter circuit $1c_R$. The subscripts "L" and "R" in reference signs indicate association with the left and right groups respectively.

The motor device 9A is provided on an electric vehicle that has driving wheels separately on the left and right sides respectively, the left-group motor $2_L$ serving to rotate the driving wheel on the left side and the right-group motor $2_R$ serving to rotate the driving wheel on the right side. The motor device 9A can be incorporated in any of various electric vehicles, such as three-wheel electric vehicles and four-wheel electric vehicles, irrespective of the number of wheels. When incorporated in a three-wheel electric vehicle having one front wheel and two, i.e. left and right, rear wheels (driving wheels), the motor device 9A rotates the rear wheels; when incorporated in a three-wheel electric vehicle having two, i.e. left and right, front wheels (driving wheels) and one rear wheel, the motor device 9A rotates the front wheels.

The motor driving circuit 1 has a DC power source 1a, a power supply circuit 1b, a left-group inverter circuit $1c_L$, and a right-group inverter circuit $1c_R$. The power supply circuit 1b, the inverter circuits ($1c_L$, $1c_R$), and the motors ($2_L$, $2_R$) are housed in separate metal cases (5a, $5b_L$, $5b_R$, $5c_L$, $5c_R$) respectively. These metal cases (5a, $5b_L$, $5b_R$, $5c_L$, $5c_R$) are connected together via the body frame of the electric vehicle.

The DC power source 1a is similar to the one in the first embodiment. The positive electrode side of the DC power source 1a is connected to a positive line L1 (supply line), and the negative electrode side of the DC power source 1a is connected to a negative line L2 (ground line). The DC power source 1a, the power supply circuit 1b, and the inverter circuits ($1c_L$, $1c_R$) are connected together via the positive line L1 and the motor 2. The positive line L1 has a single line between the positive electrode of the DC power source 1a and a branch point P, and is branched, on the succeeding-stage side of the branch point P, into two lines belonging to the left and right groups respectively.

The power supply circuit 1b has four resistors (11 to 14), a controller 15, a left-group power switch $Sw3_L$, a right-group power switch $Sw3_R$, and two normally-open switches (Sw1, Sw2).

The power switches ($Sw3_L$, $Sw3_R$) are each a FET, the channel across whose both terminals (source and drain) is controlled between an open and a closed state (an on and an off state) by the controller 15. The left-group power switch $Sw3_L$ is inserted in the left-group positive line L1 (on the succeeding-stage side of the branch point P), and serves to switch the left-group positive line L1 between a conducting and a cut-off state. The right-group power switch $Sw3_R$ is inserted in the right-group positive line L1 (on the succeeding-stage side of the branch point P), and serves to switch the right-group positive line L1 between a conducting and a cut-off state.

The normally-open switches (Sw1, Sw2) are each a photoMOS relay, the channel across whose both terminals (source and drain) is controlled between an open and a closed state (an on and an off state) by the controller 15. One end of the normally-open switch Sw1 is connected via the resistor 11 to the positive line L1 (on the preceding-stage side of the power switches ($Sw3_L$, $Sw3_R$)), and the other end of the normally-open switch Sw1 is connected to one end of the resistor 12. The other end of the resistor 12 is connected to one end of the resistor 13. One end of the normally-open switch Sw2 is connected to the other end of the resistor 13, and the other end of the normally-open switch Sw2 is connected via the resistor 14 to the negative line L2.

The connection point between the resistors 12 and 13 is connected to the body frame of the electric vehicle. The connection point between the normally-open switch Sw2 and the resistor 14 is connected to the controller 15. Thus, when the normally-open switches (Sw1, Sw2) are both in the closed state, the controller 15 can detect a voltage value Vd which results from division of the voltage between the positive line L1 and the negative line L2 by the resistors (11 to 14). As in the first embodiment, a portion of the power supply circuit 1b serves as an insulation resistance detection circuit, and the result of the detection of the voltage value Vd is used in the detection of insulation resistance.

The left-group inverter circuit $1c_L$ is provided on the succeeding-stage side of the power supply circuit 1b. The inverter circuit $1c_L$ is supplied with a DC voltage from the DC power source 1a, and serves to convert the DC voltage into a three-phase AC (alternating-current) voltage to output it to the left-group motor $2_L$. The inverter circuit $1c_L$ has a smoothing capacitor $21_L$ and also three-phase arms comprising a U-phase, a V-phase, and a W-phase arm.

One end of the smoothing capacitor $21_L$ is connected to the left-group positive line L1, and the other end of the smoothing capacitor $21_L$ is connected to the negative line L2. The U-phase, V-phase, and W-phase arms are connected in parallel, each between the left-group positive line L1 and the negative line L2.

The U-phase arm has two switching devices ($Sw4_L$ and $Sw5_L$) connected in series between the left-group positive line L1 and the negative line L2 and two diodes connected in parallel with those switching devices ($Sw4_L$ and $Sw5_L$) respectively. Each diode is arranged with its cathode pointing to the positive line L1 and its anode pointing to the negative line L2. The switching device $Sw4_L$ corresponds to an upper-arm switch (upper device) of the U phase, and the switching device $Sw5_L$ corresponds to a lower-arm switch (lower device) of the U phase.

The V-phase arm has two switching devices ($Sw6_L$ and $Sw7_L$) connected in series between the left-group positive line L1 and the negative line L2 and two diodes connected in parallel with those switching devices ($Sw6_L$ and $Sw7_L$) respectively. Each diode is arranged with its cathode pointing to the positive line L1 and its anode pointing to the negative line L2. The switching device $Sw6_L$ corresponds to an upper-arm switch (upper device) of the V phase, and the switching device $Sw7_L$ corresponds to a lower-arm switch (lower device) of the V phase.

The W-phase arm has two switching devices ($Sw8_L$ and $Sw9_L$) connected in series between the left-group positive line L1 and the negative line L2 and two diodes connected in parallel with those switching devices ($Sw8_L$ and $Sw9_L$) respectively. Each diode is arranged with its cathode pointing to the positive line L1 and its anode pointing to the negative line L2. The switching device $Sw8_L$ corresponds to an upper-arm switch (upper device) of the W phase, and the switching device $Sw9_L$ corresponds to a lower-arm switch (lower device) of the W phase.

The switching devices ($Sw4_L$ to $Sw9_L$) constituting the inverter circuit $1c_L$ are each a FET, the channel across whose both terminals (source and drain) is controlled between an open and a closed state (an on and an off state) by the controller 15.

The left-group motor $2_L$ is, for example, a three-phase permanent-magnet synchronous motor, and is driven by the three-phase AC voltage fed from the inverter circuit $1c_L$. The motor $2_L$ has three-phase lines $2a_L$, which comprise a U-phase, a V-phase, and a W-phase line, and these lines are connected together inside the motor $2_L$. The U-phase, V-phase, and W-phase lines are connected to, inside the inverter circuit $1c_L$, between the upper and lower arms of the U, V, and W phases respectively.

The right-group inverter circuit $1c_R$ is provided on the succeeding-stage side of the power supply circuit 1b. The inverter circuit $1c_R$ is supplied with a DC voltage from the DC power source 1a, and serves to convert the DC voltage into a three-phase AC (alternating-current) voltage to output it to the right-group motor $2_R$. The inverter circuit $1c_R$ has a smoothing capacitor $21_R$ and also three-phase arms comprising a U-phase, a V-phase, and a W-phase arm.

One end of the smoothing capacitor $21_R$ is connected to the right-group positive line L1, and the other end of the smoothing capacitor $21_R$ is connected to the negative line L2. The U-phase, V-phase, and W-phase arms are connected in parallel, each between the right-group positive line L1 and the negative line L2.

The U-phase arm has two switching devices ($Sw4_R$ and $Sw5_R$) connected in series between the right-group positive line L1 and the negative line L2 and two diodes connected in parallel with those switching devices ($Sw4_R$ and $Sw5_R$) respectively. Each diode is arranged with its cathode pointing to the positive line L1 and its anode pointing to the negative line L2. The switching device $Sw4_R$ corresponds to an upper-arm switch (upper device) of the U phase, and the switching device $Sw5_R$ corresponds to a lower-arm switch (lower device) of the U phase.

The V-phase arm has two switching devices ($Sw6_R$ and $Sw7_R$) connected in series between the right-group positive line L1 and the negative line L2 and two diodes connected in parallel with those switching devices ($Sw6_R$ and $Sw7_R$) respectively. Each diode is arranged with its cathode pointing to the positive line L1 and its anode pointing to the negative line L2. The switching device $Sw6_R$ corresponds to an upper-arm switch (upper device) of the V phase, and the switching device $Sw7_R$ corresponds to a lower-arm switch (lower device) of the V phase.

The W-phase arm has two switching devices ($Sw8_R$ and $Sw9_R$) connected in series between the right-group positive line L1 and the negative line L2 and two diodes connected in parallel with those switching devices ($Sw8_R$ and $Sw9_R$) respectively. Each diode is arranged with its cathode pointing to the positive line L1 and its anode pointing to the negative line L2. The switching device $Sw8_R$ corresponds to an upper-arm switch (upper device) of the W phase, and the switching device $Sw9_R$ corresponds to a lower-arm switch (lower device) of the W phase.

The switching devices ($Sw4_R$ to $Sw9_R$) constituting the inverter circuit $1c_R$ are each a FET, the channel across whose both terminals (source and drain) is controlled between an open and a closed state (an on and an off state) by the controller 15.

The right-group motor $2_R$ is, for example, a three-phase permanent-magnet synchronous motor, and is driven by the three-phase AC voltage fed from the inverter circuit $1c_R$. The motor $2_R$ has three-phase lines $2a_R$, which comprise a U-phase, a V-phase, and a W-phase line, and these lines are connected together inside the motor $2_R$. The U-phase, V-phase, and W-phase lines are connected to, inside the inverter circuit $1c_R$, between the upper and lower arms of the U, V, and W phases respectively.

The controller 15 provided in the power supply circuit 1b can output control signals to control the switches (Sw1, Sw2, $Sw3_L$ to $Sw9_L$, $Sw3_R$ to $Sw9_R$) individually between the on and off states, and controls the operation of the motor driving circuit 1 through a prescribed procedure. One example of the operation performed by the motor driving circuit 1 is insulation resistance detection operation for detecting whether or not the insulation resistance of the motor device 9 is satisfactory or not.

[Insulation Resistance Detection Operation]

In an electric vehicle incorporating the motor device 9A, when an ignition key is turned on, the vehicle goes through a predetermined start-up mode into a running mode in which it can run. In the start-up mode, the motor driving circuit 1 performs insulation resistance detection operation. Now, the insulation resistance detection operation performed by the motor driving circuit 1 will be described with reference to a flow chart in FIG. 4. At the stage before the start of the insulation resistance detection operation, the switches (Sw1, Sw2, $Sw3_L$ to $Sw9_L$, $Sw3_R$ to $Sw9_R$) are all off.

First, the controller 15 executes an insulation resistance sensor start-up conformation (step S21). The insulation resistance sensor start-up conformation is operation performed, before closing the normally-open switches (Sw1, Sw2), to check whether or not the detected value of the voltage Vd is normal (whether or not it falls within a tolerated error range with respect to 0 V). If the detected value of the voltage Vd is abnormal, for example, an alarm indicating the abnormality can be given off, and the insulation resistance detection operation can be aborted.

Next, the controller 15 turns on both normally-open switches (Sw1, Sw2) (step S22). As a result, the positive line L1 is connected via the resistors 11 and 12 to the body frame, and the negative line L2 is connected via the resistors 13 and 14 to the body frame. At this stage, the power switches ($Sw3_L$, $Sw3_R$) are still off, and accordingly the portion on the succeeding-stage side of the power switches ($Sw3_L$, $Sw3_R$), that is, the inverter circuits ($1c_L$, $1c_R$) and the motors ($2_L$, $2_R$), does not conduct to the positive electrode of the DC power source 1a.

In this state, the controller 15 checks whether or not the voltage value Vd falls within a prescribed normal range (step S23). This operation, based on a principle similar to that for the operation at step S3 in the first embodiment, is aimed at checking whether or not the insulation resistance of the power supply circuit 1b (the portion on the preceding-stage side of the power switches ($Sw3_L$, $Sw3_R$)) is satisfactory. The normal range is determined with consideration given to, for example, fluctuations in the voltage of the DC power source $1a$ so that it is possible to properly detect whether or not the insulation resistance is satisfactory.

The controller 15 recognizes, when the voltage value Vd falls within the normal range (step S23, Y), that the insulation resistance of the power supply circuit 1b is normal (no dielectric breakdown has occurred) and, when the voltage value Vd falls outside the normal range (step S23, N), that the insulation resistance is abnormal (dielectric breakdown has occurred) (step S24).

On recognizing that the insulation resistance of the power supply circuit 1b is abnormal, the controller 15 ends the insulation resistance detection operation. Here, the controller 15 can be so configured as to give off a predetermined alarm A (display, sound, or otherwise indicate it) to notify that the insulation resistance of the power supply circuit 1b is abnormal. This permits the user to recognize that dielectric breakdown has occurred and that it has occurred in the power supply circuit 1b.

On the other hand, on detecting that the insulation resistance of the power supply circuit 1b is normal, the controller 15 turns on the left-group power switch $Sw3_L$ (step S25). As a result, via the left-group power switch $Sw3_L$, the left-group inverter circuit $1c_L$ now conducts to the positive electrode of the DC power source $1a$, and thus the left-group smoothing capacitor $21_L$ is charged. At this stage, the upper-arm switching devices ($Sw4_L$, $Sw6_L$, $Sw8_L$) in the left-group inverter circuit $1c_L$ are all still off, and accordingly the portion on the succeeding-stage side of those switching devices (that is, the left-group motor $2_L$) does not conduct to the positive electrode of the DC power source $1a$.

In this state, the controller 15 checks whether or not the voltage value Vd falls within the prescribed normal range (step S26). This operation, on a principle similar to that for the operation at step S6 in the first embodiment, is aimed at checking whether or not the insulation resistance of the left-group inverter circuit $1c_L$ (the portion on the succeeding-stage side of the left-group power switch $Sw3_L$ and on the preceding-stage side of the upper arms of the left-group inverter circuit $1c_L$) is satisfactory.

The controller 15 recognizes, when the voltage value Vd falls within the normal range (step S26, Y), that the insulation resistance of the left-group inverter circuit $1c_L$ is normal (no dielectric breakdown has occurred) and, when the voltage value Vd falls outside the normal range (step S26, N), that the insulation resistance is abnormal (dielectric breakdown has occurred) (step S27).

On recognizing that the insulation resistance of the left-group inverter circuit $1c_L$ is abnormal, the controller 15 ends the insulation resistance detection operation. Here, the controller 15 can be so configured as to give off a predetermined alarm B1 (different from alarm A) to notify that the insulation resistance of the left-group inverter circuit $1c_L$ is abnormal. This permits the user to recognize that dielectric breakdown has occurred and that it has occurred in the left-group inverter circuit $1c_L$.

On the other hand, on detecting that the insulation resistance of the left-group inverter circuit $1c_L$ is normal, the controller 15 turns on the right-group power switch $Sw3_R$ (step S28). As a result, via the right-group power switch $Sw3_R$, the right-group inverter circuit $1c_R$ now conducts to the positive electrode of the DC power source $1a$, and thus the right-group smoothing capacitor $21_R$ is charged. At this stage, the upper-arm switching devices ($Sw4_R$, $Sw6_R$, $Sw8_R$) in the right-group inverter circuit $1c_R$ are all still off, and accordingly the portion on the succeeding-stage side of those switching devices (that is, the right-group motor $2_R$) does not conduct to the positive electrode of the DC power source $1a$.

In this state, the controller 15 checks whether or not the voltage value Vd falls within the prescribed normal range (step S29). This operation, on a principle similar to that for the operation at step S6 in the first embodiment, is aimed at checking whether or not the insulation resistance of the right-group inverter circuit $1c_R$ (the portion on the succeeding-stage side of the right-group power switch $Sw3_R$ and on the preceding-stage side of the upper arms of the right-group inverter circuit $1c_R$) is satisfactory.

The controller 15 recognizes, when the voltage value Vd falls within the normal range (step S29, Y), that the insulation resistance of the right-group inverter circuit $1c_R$ is normal (no dielectric breakdown has occurred) and, when the voltage value Vd falls outside the normal range (step S29, N), that the insulation resistance is abnormal (dielectric breakdown has occurred) (step S30).

On recognizing that the insulation resistance of the right-group inverter circuit $1c_R$ is abnormal, the controller 15 ends the insulation resistance detection operation. Here, the controller 15 can be so configured as to give off a predetermined alarm B2 (different from alarms A and B1) to notify that the insulation resistance of the right-group inverter circuit $1c_R$ is abnormal. This permits the user to recognize that dielectric breakdown has occurred and that it has occurred in the right-group inverter circuit $1c_R$.

On the other hand, on detecting that the insulation resistance of the right-group inverter circuit $1c_R$ is normal, the controller 15 keeps the upper arm of one phase (for example, the U phase) of the left-group inverter circuit $1c_L$ on for a predetermined period (step S31). Here, so that the upper arm may be kept on properly, first the lower arm of the same phase is kept on for a very short period and, after this lower arm is turned off, the upper arm is turned on. With respect to the operation at step S31, the control for turning on the upper and lower arms of the inverter circuit $1c_L$ can be directly performed by the controller 15 provided in the power supply circuit 1b, or can be performed by an unillustrated microprocessor (capable of operating in coordination with the controller 15 via CAN communication) provided in the inverter circuit $1c_L$.

As a result, via the upper arm that is now on, the left-group three-phase lines $2a_L$ conduct to the positive electrode of the DC power source $1a$. While the upper arm is on, the controller 15 checks whether or not the voltage value Vd falls within the prescribed normal range (step S32). This operation, based on a principle similar to that for the operation at step S9 in the first embodiment, is aimed at checking whether or not the insulation resistance of the left-group three-phase lines $2a_L$ (the portion on the succeeding-stage side of the upper arms of the left-group inverter circuit $1c_L$) is satisfactory.

The controller 15 recognizes, when the voltage value Vd falls within the normal range (step S32, Y), that the insulation resistance in the left-group three-phase lines $2a_L$ is normal (no dielectric breakdown has occurred) and, when the voltage value Vd falls outside the normal range (step S32, N), that the insulation resistance is abnormal (dielectric breakdown has occurred) (step S33).

On recognizing that the insulation resistance of the left-group three-phase lines $2a_L$ is abnormal, the controller 15 ends the insulation resistance detection operation. Here, the controller 15 can be so configured as to give off a predetermined alarm C1 (different from alarms A, B1, and B2) to notify that the insulation resistance of the left-group three-phase lines $2a_L$ is abnormal. This permits the user to recognize that dielectric breakdown has occurred and that it has occurred in the left-group three-phase lines $2a_L$.

On the other hand, if the insulation resistance of the left-group three-phase lines $2a_L$ is found to be normal, the controller 15 keeps the upper arm of one phase (for example, the U phase) of the right-group inverter circuit $1c_R$ on for a predetermined period (step S34). Here, so that the upper arm may be kept on properly, first the lower arm of the same phase is kept on for a very short period and, after this lower arm is turned off, the upper arm is turned on. With respect to the operation at step S34, the control for turning on the upper and lower arms of the inverter circuit $1c_R$ can be directly performed by the controller 15 provided in the power supply circuit 1b, or can be performed by an unillustrated microprocessor (capable of operating in coordination with the controller 15 via CAN communication) provided in the inverter circuit $1c_R$.

As a result, via the upper arm that is now on, the right-group three-phase lines $2a_R$ conduct to the positive electrode of the DC power source 1a. While the upper arm is on, the controller 15 checks whether or not the voltage value Vd falls within the prescribed normal range (step S35). This operation, based on a principle similar to that for the operation at step S9 in the first embodiment, is aimed at checking whether or not the insulation resistance of the right-group three-phase lines $2a_R$ (the portion on the succeeding-stage side of the upper arms of the right-group inverter circuit $1c_R$) is satisfactory.

The controller 15 recognizes, when the voltage value Vd falls within the normal range (step S35, Y), that the insulation resistance in the right-group three-phase lines $2a_R$ is normal (no dielectric breakdown has occurred) and, when the voltage value Vd falls outside the normal range (step S35, N), that the insulation resistance is abnormal (dielectric breakdown has occurred) (step S36).

On recognizing that the insulation resistance of the right-group three-phase lines $2a_R$ is abnormal, the controller 15 ends the insulation resistance detection operation. Here, the controller 15 can be so configured as to give off a predetermined alarm C2 (different from alarms A, B1, B2, and C1) to notify that the insulation resistance of the right-group three-phase lines $2a_R$ is abnormal. This permits the user to recognize that dielectric breakdown has occurred and that it has occurred in the right-group three-phase lines $2a_R$.

On the other hand, if the insulation resistance of the right-group three-phase lines $2a_R$ is found to be normal, this means that it has been recognized that the insulation resistance is normal with respect to all of the power supply circuit 1b, the inverter circuits ($1c_L$, $1c_R$), and the three-phase lines ($2a_L$ and $2a_R$). Accordingly, in this case, the controller 15 recognizes that the insulation resistance is normal in the entire motor device 9A (no dielectric breakdown has occurred) (step S37), and ends the insulation resistance detection operation.

[Features of the Motor Driving Circuit]

As described above, the motor driving circuit 1 according to the second embodiment is provided with: a supply line L1 connected to a DC power source 1a; an inverter circuit of which the input side is connected to the supply line L1 and of which the output side is connected to a motor, the inverter circuit converting DC electric power fed from the supply line L1 into alternating-current electric power and feeding the alternating-current electric power to the motor; and a power switch inserted in the supply line L1 for switching the supply line L1 between a conducting state and a cut-off state. As the inverter circuit, inverter circuits ($1c_L$, $1c_R$) are provided to belong to two, i.e. left and right, groups respectively, and as the power switch, power switches ($Sw3_L$, $Sw3_R$) are provided to belong to two, i.e. left and right, groups respectively. In this embodiment, as an example, between the DC power source 1a and the left-group inverter circuit $1c_L$, the left-group power switch $Sw3_L$ is provided, and between the DC power source 1a and the right-group inverter circuit $1c_R$, the right-group power switch $Sw3_R$ is provided.

The motor driving circuit 1 is further provided with: a functional portion (voltage detector) for detecting the voltage at the location that lies between the DC power source 1a and the left-group power switch $Sw3_L$ and simultaneously between the DC power source 1a and the right-group power switch $Sw3_R$, that is, the location that lies, with respect to both power switches ($Sw3_L$, $Sw3_R$), between the DC power source 1a and them. The motor driving circuit 1 is further provided with a functional portion (insulation resistance detector) for first performing a first detection operation to detect, based on the result of detection by the voltage detector with the power switches ($Sw3_L$, $Sw3_R$) in the cut-off state, the insulation resistance of the power supply circuit 1b (on the preceding-stage side of the power switches ($Sw3_L$, $Sw3_R$)), and subsequently performing a second detection operation to detect, based on the result of detection by the voltage detector with the power switches in the conducting state, the insulation resistance of the inverter circuit (on the succeeding-stage side of the power switches ($Sw3_L$, $Sw3_R$)). The second detection operation is performed separately for each of the left and right groups.

Thus, the motor driving circuit 1 can detect insulation resistance separately for different portions of the motor device 9 (in this embodiment, for each of the power supply circuit 1b and the inverter circuits ($1c_L$, $1c_R$)), and in addition, owing to insulation resistance detection for different portions being achieved by a common circuit, allows easy simplification of circuit configuration. In this embodiment, the first detection operation corresponds to the operation at step S23, and the second detection operation corresponds to the operation at steps S26 and S29.

Each of the inverter circuits ($1c_L$, $1c_R$) has three-phase arms, and each arm includes an upper device and a lower device as switching devices connected in series between the positive electrode and the negative electrode of the DC power source 1a. Between the upper and lower devices of each arm, three-phase motors ($2_L$, $2_R$) are connected. The insulation resistance detector performs, as the second detection operation, an operation to detect, based on the result of detection by the voltage detector with all the upper devices in an off state, the insulation resistance of the inverter circuit (on the preceding-stage side of the upper devices), and performs, subsequently to the second detection operation, as a third detection operation, an operation to detect, based on the result of detection by the voltage detector with one of the upper devices in an on state, the insulation resistance of three-phase lines of the motor (on the succeeding-stage side of the upper devices). The third detection operation is performed separately for each of the left and right groups.

Thus, the motor driving circuit 1 can detect, with a common circuit, the insulation resistance of the power supply circuit 1b, those of the inverter circuits ($1c_L$, $1c_R$) respectively, and those of the three-phase lines ($2a_L$, $2a_R$) respectively. In this embodiment, the third detection operation corresponds to the operation at steps S32 and S35. Although in this embodiment the inverter circuit 1c and the motor 2 are of a three-phase type, they can instead be of a single-phase type, or of a two-phase, four-phase, or any other multiple-phase type.

The motor driving circuit 1 can be understood to be provided with inverter circuits ($1c_L$, $1c_R$) provided in parallel to belong to a left and a right group respectively, and a plurality of power switches ($Sw3_L$, $Sw3_R$) provided to belong to the left and right groups respectively. It can then be understood that the voltage detector serves to detect the voltage between the DC power source 1a and each power switch, and that the insulation resistance detector first performs, as the first detection operation, an operation to detect, based on the result of detection by the voltage detector with all the power switches in a cut-off state, the insulation resistance on the preceding-stage side of the power switches and subsequently performs the second and third detection operations for each of the left and right groups.

More specifically, the insulation resistance detector is configured to perform the second detection operation for each of the left and right groups and then perform the third detection operation for each of the left and right groups. In this way, the motor driving circuit 1 can detect, one after the next, the insulation resistance of the power supply circuit 1b, those of the inverter circuits ($1c_L$, $1c_R$) respectively, and those of the three-phase lines ($2a_L$, $2a_R$) respectively.

In the motor driving circuit 1, when an abnormal insulation resistance is detected in any of the first to third detection operations, an output (alarm A, B1, B2, C1, or C2) that is set to differ among the different detection operations is delivered. Thus, when dielectric breakdown has occurred, the user can identify its location among different portions of the motor device 9A. This permits the user to react more properly than when the location is not identified.

In the motor driving circuit 1, when an abnormal insulation resistance is detected in any of the first to third detection operations, execution of any detection operation thereafter is omitted. Specifically, if an abnormal insulation resistance is detected in the first detection operation, execution of the second and third detection operations is omitted; if an abnormal insulation resistance is detected in the second detection operation, execution of the third detection operation is omitted. This prevents execution of an unnecessary detection operation, and helps reduce the operation burden on the motor driving circuit 1.

The motor device 9 according to the second embodiment is so implemented as to have an inverter circuit 1b, a motor 2, and other components separately for each of two, i.e., left and right, groups. In a modified example, the motor device 9 can have three or more such groups. Also in that case, the motor device 9 can perform insulation resistance detection operation to detect insulation resistance separately for different portions in a manner confirming to this embodiment.

Other

The present invention can be implemented in any other manner than specifically described by way of embodiments above, with many modifications made within the spirit of the invention. That is, the embodiments presented above should be understood to be in every aspect illustrative and not restrictive. The technical scope of the present invention is defined not by the description of embodiments given above, but by the appended claims, and should be understood to encompass any modifications made in the sense and scope equivalent to those of the appended claims.

For example, although in both embodiments, the motor driving circuit 1 is applied to an electric vehicle and serves to rotate a driving wheel, this is not meant to limit the scope of application of the present invention in any way. Motor driving circuits according to the present invention find various applications involving motors.

INDUSTRIAL APPLICABILITY

The present invention finds applications, for example, in electric vehicles.

LIST OF REFERENCE SIGNS 1 motor driving circuit
1a DC power source
1b power supply circuit
1c, $1c_L$, $1c_R$, inverter circuit
2, $2_L$, $2_R$ motor
2a, $2a_L$, $2a_R$ three-phase lines
5a-5c, $5b_L$, $5c_L$, $5b_R$, $5c_R$ metal case
9, 9A motor device
11-14 resistor
15 controller
21, $21_L$, $21_R$ smoothing capacitor
L1 positive line (supply line)
L2 negative line
Sw1, Sw2 normally-open switch
Sw3, $Sw3_L$, $Sw3_R$ power switch
Sw4, $Sw4_L$, $Sw4_R$ switching device (U-phase upper device)
Sw5, $Sw5_L$, $Sw5_R$ switching device (U-phase lower device)
Sw6, $Sw6_L$, $Sw6_R$ switching device (V-phase upper device)
Sw7, $Sw7_L$, $Sw7_R$ switching device (V-phase lower device)
Sw8, $Sw8_L$, $Sw8_R$ switching device (W-phase upper device)
Sw9, $Sw9_L$, $Sw9_R$ switching device (W-phase lower device)

The invention claimed is:

1. A motor driving circuit, comprising:
a supply line connected to a direct-current power source;
an inverter of which an input side is connected to the supply line, the inverter converting direct-current electric power fed from the supply line into alternating-current electric power and feeding the alternating-current electric power to a motor connected to an output side of the inverter;
a power conduction switch provided on the supply line for switching the supply line between a conducting state and a cut-off state;
a voltage detector for detecting a voltage between the direct-current power source and the power conduction switch; and
an insulation resistance detector for detecting whether or not an insulation resistance is satisfactory based on a detection result from the voltage detector,
wherein
the insulation resistance detector detects, based on the detection result from the voltage detector with the power conduction switch in the cut-off state and the detection result from the voltage detector with the power conduction switch in the conducting state, whether or not an insulation resistance on a preceding-stage side of the power conduction switch is satisfactory and whether or not an insulation resistance on a succeeding-stage side of the power conduction switch is satisfactory.

2. The motor driving circuit according to claim 1, wherein:
the insulation resistance detector detects, based on the detection result from the voltage detector with the power conduction switch in the cut-off state, whether or not the insulation resistance on the preceding-stage side of the power conduction switch is satisfactory.

3. The motor driving circuit according to claim 1, wherein:

the power conduction switch is provided between the direct-current power source and the inverter, the inverter has an arm for a single phase, or arms for a plurality of phases, the arm, or each of the plurality of arms, is provided with an upper device and a lower device as switching devices connected in series between a positive electrode and a negative electrode of the direct-current power source, the motor is connected between the upper and lower devices, and the insulation resistance detector detects, based on the detection result from the voltage detector with all the upper devices off and the detection result from the voltage detector with at least one of the upper devices on, whether or not an insulation resistance on a preceding-stage side of the upper device is satisfactory and whether or not an insulation resistance on a succeeding-stage side of the upper device is satisfactory.

4. The motor driving circuit according to claim 3, wherein:

the insulation resistance detector detects, based on the detection result from the voltage detector with all the upper devices off, whether or not the insulation resistance on the preceding-stage side of the upper device is satisfactory.

5. The motor driving circuit according to claim 1, wherein:

the inverter comprises a plurality of groups of inverters connected in parallel with each other, and the power conduction switch comprises a plurality of power conduction switches provided between the direct-current power source and the inverters so as to correspond to the plurality of groups of inverters respectively, the voltage detector detects, for any of the power conduction switches, a voltage at a location that lies between the direct-current power source and the power conduction switch, and the insulation resistance detector detects, based on the detection result from the voltage detector with all the power conduction switches in the cut-off state and the detection result from the voltage detector with at least one of the power conduction switch in the conducting state, whether or not the insulation resistance on the preceding-stage side of the power conduction switch is satisfactory and whether or not the insulation resistance on the succeeding-stage side of the power conduction switch that is conducted is satisfactory.

6. A motor device, comprising:

the motor driving circuit according to claim 1; and a motor connected to the output side of the inverter.

7. An electric vehicle, comprising:

the motor device according to claim 6; and a driving wheel rotated by the motor.

8. A motor driving circuit, comprising:

a supply line connected to a direct-current power source;

an inverter of which an input side is connected to the supply line, the inverter converting direct-current electric power fed from the supply line into alternating-current electric power and feeding the alternating-current electric power to a motor connected to an output side of the inverter;

a voltage detector for detecting a voltage between the direct-current power source and the inverter; and an insulation resistance detector for detecting whether or not an insulation resistance is satisfactory based on a detection result from the voltage detector, wherein the inverter has an arm for a single phase, or arms for a plurality of phases, the arm, or each of the plurality of arms, is provided with an upper device and a lower device as switching devices connected in series between a positive electrode and a negative electrode of the direct-current power source, the motor is connected between the upper and lower devices, and the insulation resistance detector detects, based on the detection result from the voltage detector with all the upper devices off and the detection result from the voltage detector with at least one of the upper devices on, whether or not an insulation resistance on a preceding-stage side of the upper device is satisfactory and whether or not an insulation resistance on a succeeding-stage side of the upper device is satisfactory.

9. The motor driving circuit according to claim 8, wherein:

the insulation resistance detector detects, based on the detection result from the voltage detector with all the upper devices off, whether or not the insulation resistance on the preceding-stage side of the upper device is satisfactory.

10. The motor driving circuit according to claim 8, wherein:

the inverter comprises a plurality of groups of inverters connected in parallel with each other, and the voltage detector detects, for any of the inverters, a voltage at a location that lies between the direct-current power source and the inverter, and the insulation resistance detector detects, based on the detection result from the voltage detector with all the upper devices of the inverters in the cut-off state and the detection result from the voltage detector with at least one of the upper devices of the inverters in the conducting state, whether or not the insulation resistance on the preceding-stage side of the upper device of each inverter is satisfactory and whether or not the insulation resistance on the succeeding-stage side of the upper device on the inverter that is on is satisfactory.

11. A motor device, comprising:

the motor driving circuit according to claim 8; and a motor connected to the output side of the inverter.

12. An electric vehicle, comprising:

the motor device according to claim 11; and a driving wheel rotated by the motor.

* * * * *